United States Patent [19]
Desai et al.

[11] 3,773,604
[45] Nov. 20, 1973

[54] STRUCTURAL LIGHT - WEIGHT PANEL OF HIGH STRENGTH, HAVING THERAL INSULATION PROPERTIES AND ENCLOSURES FORMED THEREBY

[75] Inventors: Ramesh R. Desai, Teaneck; George D. Dohn, Park Ridge, both of N.J.

[73] Assignee: Balsa Ecuador Lumber Corporation, Northvale, N.J.

[22] Filed: Nov. 10, 1971

[21] Appl. No.: 197,314

Related U.S. Application Data

[63] Continuation-in-part of Ser. No. 114,201, Feb. 10, 1971, Pat. No. 3,669,815.

[52] U.S. Cl. ............... 161/37, 52/249, 52/309, 161/159, 161/190, 161/56, 220/9
[51] Int. Cl. ........ B32b 3/16, B65d 3/22, B32b 5/18, E04c 2/00, B32b 27/40, B32b 5/12
[58] Field of Search ............... 161/36, 37, 39, 56, 161/159, 190; 52/249, 309, 415, 613; 220/9 LG

[56] References Cited
UNITED STATES PATENTS
3,437,547   4/1969   Sullivan ........................... 161/37 X
3,540,967   11/1970  Shook et al. ..................... 161/37 X
1,356,764   10/1920  Henderson ......................... 161/56
3,325,037   6/1967   Kohn et al. ..................... 161/36 X

*Primary Examiner*—Philip Dier
*Attorney*—Michael Ebert

[57] ABSTRACT

A structural light-weight panel of high strength, having thermal insulation properties that render the panel particularly suitable for cryogenic and elevated temperature applications. The panel is constituted by a composite core bonded to a carrier membrane or laminated to facing skins, the core including at least one layer formed by a series of balsa beams in spaced relation, the spacing between the beams being filled with slabs of an insulating material such as rigid foam plastic material whose $k$-factor is similar to that of balsa, whereby the overall thermal insulating characteristics of the composite core are effectively equivalent to that of a homogeneous core composed entirely of foam plastic material, whereas the structural characteristics of the composite core are far superior thereto. The panels are useable as liners for structural enclosures for the storage of fluids at cryogenic to high temperatures.

12 Claims, 9 Drawing Figures

Patented Nov. 20, 1973
3,773,604
2 Sheets-Sheet 1
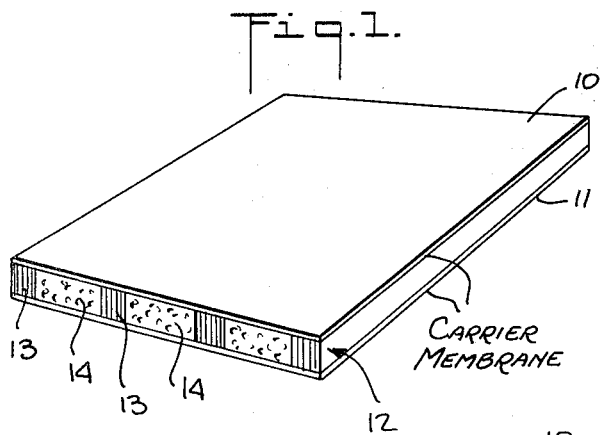
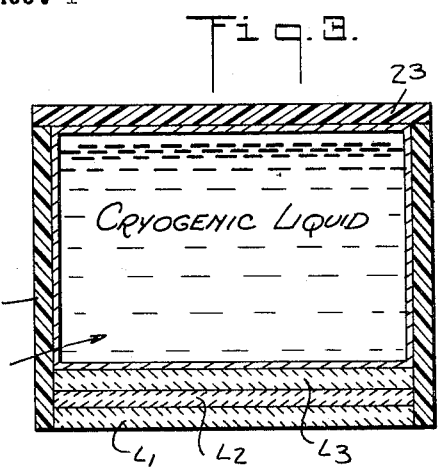
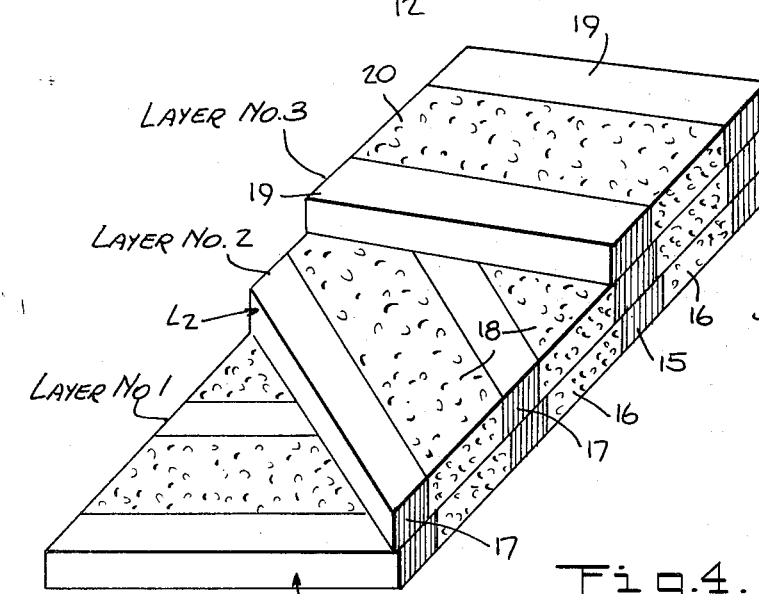
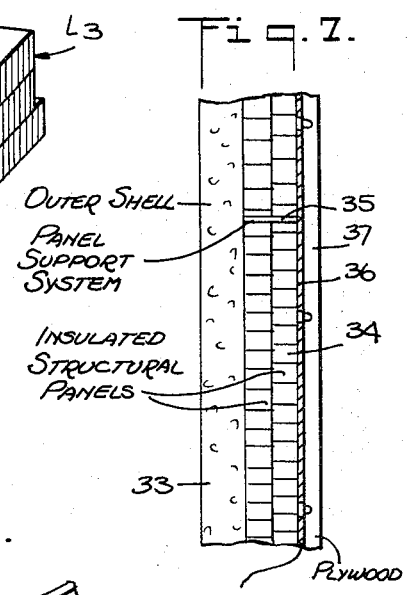
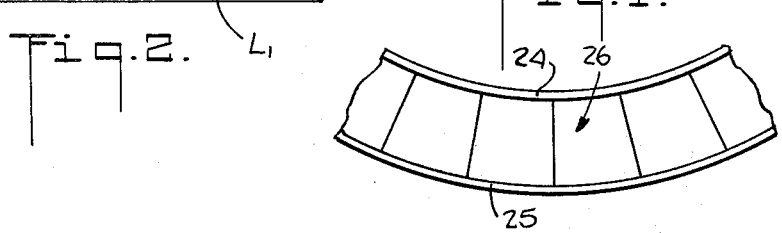
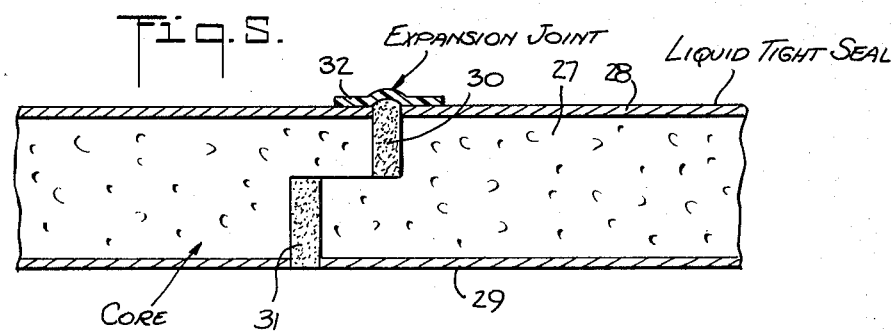

Patented Nov. 20, 1973

STRUCTURAL LIGHT - WEIGHT PANEL OF HIGH STRENGTH, HAVING THERAL INSULATION PROPERTIES AND ENCLOSURES FORMED THEREBY

RELATED APPLICATION

This application is a continuation-in-part of the co-pending application Ser. No. 114,201, filed Feb. 10, 1971 now U.S. Pat. No. 3,669,815.

BACKGROUND OF THE INVENTION

This invention relates generally to thermal insulation for cryogenic and elevated temperature applications, and more particularly to high-strength structural panels and sandwich laminates which afford thermal insulation.

Cryogenics, which deals with the phenomena of extreme cold, is assuming considerable commercial significance. In recent years, for example, liquid gases having low boiling points, such as nitrogen and air, have been widely used to freeze perishables which are then protectively stored in insulated containers for prolonged periods without spoilage, or are transported by railroad, truck or vessel over long distances without the need for mechanical refrigeration.

It is also the current practice to liquefy natural gas or methane and to transport the gas in the liquid state in thermally-insulated tanks. The fact that natural gas in liquefied form occupies a volume which is only one six-hundredth of the fuel in the gaseous state, renders the liquefaction process economically feasible even when the liquid must be transported for thousands of miles from the oil well, where it is available as a byproduct, to the consumer market. To this end, ocean-going vessels have been specifically fitted to carry cargoes of liquefied natural gas.

The primary concern of the present invention is with containers intended for cryogenic purposes, wherein the load, which may be in liquid or solid form, is at an extremely low temperature and must therefore be thermally insulated from ambient temperature. By "ambient temperature" is meant the temperature of the ambient air or water to which the loaded container is exposed in storage or transit. By "cryogenic container" is meant any form of thermally insulated, low-temperature enclosure, such as a crate or box intended for rail transporation, a thermally insulated trailer truck, or an insulated tank to be installed on a barge, a vessel, or placed in or above ground.

In all forms of cryogenic containers, the structural and thermal problems are similar, for the container must be realized sufficient structural strength to support the load under the most severe conditions encountered in practice, and yet the insulation must be such as to maintain the low temperature of the load within the proper limits despite wide variations In ambient temperature. Moreover, the thermally insulated structure must be capable of withstanding the stresses produced by the wide temperature differential between the cryogenic load temperature and ambient temperature.

The extremes of temperature to which the cryogenic container is subjected will be appreciated when it is realized that cold liquid hydrocarbons at atmospheric pressure have a temperature in the order of $-265°$ F., whereas ambient temperature may range between $0°$ F. and $+115°$ F. In the case of liquid nitrogen or liquid helium, the cryogenic temperature is even lower.

In the prior patents to Kohn et al U.S. Pat. No. 3,325,037 and Lippay U.S. Pat. No. 3,298,892, there are disclosed structural panels whose core is formed of end-grain balsa wood, the panels having an exceptionally high strength-to-weight ratio as well as excellent thermal insulation properties. Balsa has outstanding properties unique in the lumber field, for it averages less than nine pounds per cubic foot, which is forty percent of the weight of the lightest North American species. The cell structure of balsa affords a combination of high rigidity and compressive and tensile strength, far superior to any composite, matted or synthetic material of equal or high density. Balsa has a low coefficient of expansion, and hence it deforms very little under severe temperature changes; i.e., balsa is essentially dimensionally stable. Finally, balsa may be processed by standard woodworking techniques.

The $k$-factor of balsa is such as to render this material highly suitable as thermal insulation. $k$-factor is the symbol for thermal conductivity, which is the amount of heat expressed in Btu's, transmitted in 1 hour through 1 square foot of homogeneous material 1 inch thick, for each degree of Fahrenheit of temperature difference between opposing surfaces of the material.

The $k$-factor of balsa is comparable to that of many insulating materials, e.g., foam plastics, but there is no basis for comparison as to their structural properties, for low-density foam materials are incapable of supporting substantial loads. On the other hand, balsa wood is a relatively expensive material, whereas the equivalent amount of rigid foam material providing comparable thermal insulation, is of low cost.

SUMMARY OF THE INVENTION

In view of the foregoing, it is the primary object of this invention to provide improved structural panels which are thermally insulating and are therefore suitable for cryogenic applications or insulation at elevated temperature, the panel incorporating both foam plastic or other insulating material and balsa wood in a composite core.

More specifically, an object of the invention is to provide a structural panel of light weight and high strength, the panel being constituted by a composite core bonded to a carrier membrane or laminated to facing sheets, which composite core is formed by at least one layer of balsa beams in spaced relation, the spacing between the beams being filled with slabs of rigid foam plastic material.

A significant feature of the invention resides in the fact that the overall thermal insulating characteristics of the composite core are effectively equivalent to those of a homogeneous core composed entirely of foam plastic material, whereas the structural properties of the composite core are far superior thereto.

Another advantage of the invention is that the cost of the composite core, which is a major factor in the cost of the panel, becuase it is made up in large part of low-density foam plastic material, is substantially lower than that of a straightforward balsa core. Also, because the core is composed of distinct beams and slabs, rather than a one-piece body, when the core elements are bonded to flexible facing skins, or to a carrier membrane, it becomes possible to contour the panel to conform to a desired curvature.

Also an object of the invention is to provide a structural panel constituted by a composite core bonded to a carrier membrane or laminated to facing sheets, which composite core is formed by at least one layer of balsa beams in spaced relation, the spacing between the beams being filled with precompressed slabs of rigid foam plastic material. It is to be noted that at cryogenic temperatures, the foam slabs contract more than the balsa beams, thus creating a gap between them. By precompression of the slabs, the contraction resulting from low temperature is compensated for by the decompression of the slabs, thereby avoiding undesirable gaps.

Still another object of the invention is to provide an enclosure formed by panels of the type describeed herein. Such enclosures can be used for storing materials at cryogenic or elevated temperatures. A salient advantage of the invention resides in the fact that the facing sheets can be formed of materials, e.g., high-pressure phenolics, metals, plastics, etc., so that when these panels are joined by proper expansion joints, the insulated enclosure becomes liquid-tight. Thus, the use of these panels provides a structural, liquid-tight, insulating enclosure and hence, eliminates the need of the commonly used nickel-steel liner.

Yet another object of the invention is to provide a panel formed by a multi-layer core of the above-described type, each layer being formed of parallel balsa and foam plastic elements which are angularly disposed relative to the parallel elements of the other layers whereby leakage paths which exist at the junctions of the elements in each layer are blocked, thereby minimizing convection losses.

Briefly stated, these objects are attained in one preferred embodiment of the invention by a structural panel composed of a composite core bonded to a carrier membrane or sandwiched between and laminated to facing sheets of a material suitable for cryogenic or elevated temperature applications, the composite core comprising three layers in superposed relation, each layer being formed by a series of end-grain balsa beams in parallel relation and an interlaced series of slabs of rigid foam plastic material, the beams and slabs in each layer being mutually displaced by 60°.

OUTLINE OF THE DRAWING

For a better understanding of the invention, as well as other objects and further features thereof, reference is made to the following detailed description to be read in conjunction with the annexed drawing, wherein:

FIG. 1 is a perspective view of a single-layer structural panel in accordance with the invention;

FIG. 2 is a perspective view of a multi-layered structural panel in accordance with the invention, the facing sheets being omitted;

FIG. 3 is a section through a cryogenic container including a multi-layer core panel in accordance with the invention;

FIG. 4 shows, in section, a contoured structural panel in accordance with the invention;

FIG. 5 shows a preferred form of expansion joint between adjoining structural panels;

FIG. 9 is an end view of the two-layer panel.

DESCRIPTION OF THE INVENTION

Figure 6:
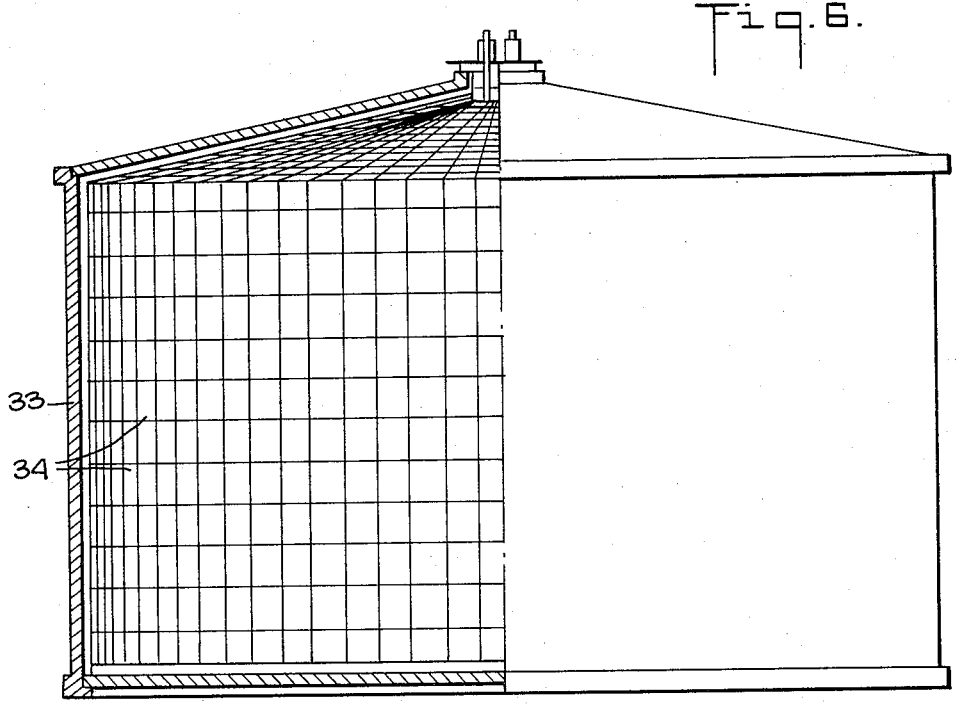
FIG. 6 is an elevational view of an enclosure in accordance with the invention.

Referring now to FIG. 1, there is shown a simple embodiment of a structural sandwich panel in accordance with the invention. The sandwich panel is constituted by facing sheets 10 and 11 which may be formed by metal, wood, fabric or other suitable rigid, semi-rigid, or flexible sheeting material, between which is interposed a core generally designated by numeral 12, the core being bonded to the facing sheets by a suitable adhesive or bonding agent.

Core 12 is composed of a single layer of beams 13 of balsa in spaced parallel relation which alternate with parallel slabs 14 of rigid foam plastic material having a $k$-factor suitable for cryogenic insulation. Preferably the balsa is in end-grain form. By end-grain balsa is meant that the grain of the balsa is parallel to the load imposed thereon, in which event the balsa has a far higher compressive strength than flat-grain balsa in which the load is perpendicular to the grain. In some applications, however, where the load is not essentially compressive in nature, but subjects the panel to bending stresses, then flat-grain balsa is the more appropriate material.

The foam plastic material may be constituted by polyurethane foam, polystyrene foam, polyvinyl chloride foam, foamed glass or any other commercially available low-cost insulating materials having acceptable thermal properties.

Though balsa is available in weights of approximately 6 pounds per cubic foot, which is much lighter than other forms of lumber, foam plastics are still lighter. Thus polyurethane foam depending on its density, is available in weights of 2 or 4 pounds per cubic foot. The $k$-factors of balsa and urethane foam are quite comparable at low temperature. Thus at −260° F., the $k$-factor of one commercial form of balsa (6 pounds per cu. ft.) is 0.11 or less while that of urethane foam (2 pounds per cu. ft.) is also 0.11 to 0.14. But denser urethane foam (4 pounds per cu. ft.) has a poor $k$-factor of 0.15 or higher.

Because the ability of foam plastic material to sustain a load becomes greater as its density is increased, it has heretofore been the practice when using foam plastic to support a relatively heavy load, to use a dense plastic such as urethane foam weighing 6 pounds per cubic foot for this purpose. But since the i k-factor is poorer for higher densities, the use of high density foam to support a load is at the expense of thermal insulation properties and increases the cost of the support.

This drawback, as will now be explained, is overcome by the present invention, which makes possible a core having excellent structural properties without sacrificing thermal characteristics.

It will be seen in FIG. 1 that the beams of balsa and the slabs of foam plastic forming core 12 are of the same thickness and length, whereas the slabs are substantially broader than the beams, so that foam is the predominant material of the core. Since low density foam is considerably cheaper than balsa, the overall cost of the core is much lower than a core composed entirely of balsa. Moreover, the composite core panel is somewhat lighter than a balsa core panel. On the other hand, since the $k$-factor of foam is about the same as that of balsa, the overall thermal characteristics of the composite core panel are similar to that of a homogeneous low-density foam core panel.

Because of the exceptional structural characteristics of the end-grain balsa beams, the composite core panel is capable of sustaining heavy cryogenic or elevated temperature loads. Obviously, the strength of the core depends on the ratio of balsa to foam plastic material, the larger the relative amount of balsa the stronger the core. It is also to be borne in mind that the dynamic characteristics of Balsa are such that it can withstand vibration and impact, whereas rigid foam plastic materials degrade or disintegrate under such conditions. But in the composite core, since the load is carried by the balsa, any degradation of the foam plastic does not affect the structural strength of the panel.

In a structural sandwich laminate, the main function of the core material bonded to the facing sheets or skins is to stabilize and stiffen the skins. The bonded core also converts the skins into a unitary structure of great rigidity so that they deform much less under load conditions than they would unjoined. The material of the facings must be appropriate to the temperatures involved.

In practice, the facings may take the form of an open-mesh, flexible screen of non-stretchable material, such as fiber glass, or it may be made of polyurethane film forming a secondary barrier to cryogenic liquids, or even of paper. The facing sheets may also be made of plywood, aluminum, high-pressure phenolics or steel sheeting. The adhesive for bonding the core to the facings must be suitable for cryogenic purposes. Epoxies, vinyl phenolics and polyurethane elastomers may be used for this purpose.

The invention does not require the use of facings to form a structural panel, and one may combine the composite core with a single carrier membrane or scrim serving merely to hold the core elements together.

In the core arrangement shown in FIG. 1, the junctions between balsa beams 13 and foam plastic slabs 14 (unless these junctions are bonded to each other), represent a possible leakage path resulting in convection losses. To avoid the possibility of such losses as well as to provide a strengthened cross-beam core, multi-layer arrangements may be created in which the beams and slabs of each layer are angularly displaced relative to those of the other layers, thereby blocking the junction paths.

Thus as shown in FIG. 2, a three-layer core is shown in which the first layer $L_1$ is composed of Balsa beams 15, alternating with foam plastic slabs 16, the second layer $L_2$ whose being similarly composed of balsa beams 17 and foam plastic slabs 18 and the third layer $L_3$ by balsa beams 19 and foam plastic slabs 20. However, the beams and slabs of layer $L_3$ are displaced 60° with respect to those of layer $L_2$ whose beams and slabs are displaced 60° relative to those of layer $L_1$. It will be obvious, however, that in practice a core may be composed of only two layers, or more than three, depending on the desired core dimensions, or the layers may have other angular displacements.

In the cryogenic container shown in FIG. 3, the cryogenic liquid is stored in a tank 21, which may be fabricated of metal or plastic material capable of withstanding the low temperatures involved. To thermally insulate the tank bottom, it is placed on a pad formed by a structural panel having a core of three composite layers $L_1$, $L_2$ and $L_3$ of the type shown in FIG. 2. The structural panel, because of the composite core arrangement is capable of sustaining a heavy load.

The tank is surrounded by a thermal insulating jacket 22 which is formed of the structural panel material described herein. The upper end of the tank is covered by an insulating liner 23.

Because the core is composed of planks and slabs rather than of one-piece material, it lends itself to contouring when used in conjunction with flexible facing sheets. Thus as shown in FIG. 4, the panel is composed of flexible facing sheets 24 and 25 between which is sandwiched a composite core 26 formed by alternate beams of balsa and slabs of foamed plastic material, which beams and slabs have a trapezoidal cross section making it possible to contour the panel without creating spaces between the core elements.

While the panel has been described in conjunction with liquid cryogenic loads, it is not limited thereto and may be used, for example, in insulated containers for frozen perishables or for applications where the temperature of the load is higher than ambient temperature, such as in chemical processing tanks.

Instead of foam plastics, other insulating materials may be used, typical examples being expanded mineral insulations, known commercially as Perlite Vermiculite, etc., fiberboards, fiberglass insulation, super insulation products, rockwool, hairfelt and cork. One may also combine these materials, i.e., in the coldest and highly stressed areas, the insulation may comprise foam slabs and balsa beams, whereas the warmer and less stressed areas may be insulated by balsa beams and bags of mineral insulation, material fiberglass insulation, etc. Also, instead of balsa wood, other structural insulating materials can be used, e.g., fiberboard, high-density foamed glass, etc. Finally, various other shapes and arrangements of balsa and other insulating materials can be used to meet specific goals.

When a panel in accordance with the invention, constituted by a composite balsa-foam plastic core is cooled to cryogenic temperatures, the foam slabs will contract to a greater degree than the balsa beams. For example, if the core formed of a total of 2.5 feet wide of balsa beams and 5.5 feet of foam slabs drops in temperature from 80° to −260° F, the slabs will contract 1.1 inch whereas the beams will contract 0.07 inch, thus creating gaps between them. To overcome this drawback, the slabs are precompressed by a total of at least 1.1 inch, so that as the slabs contract, they decompress to obviate gapping.

The conventional cryogenic tank usually consists of an inner container, generally formed of nickel steel capable of storing the cryogenic liquid surrounded by insulating layers and an outer jacket. It is possible, using structural panels, in accordance with the invention, to do away with the inner container, the panels in this instance functioning not only as insulation but also to contain the liquid. For this purpose, the inner facing sheet of the structural panels must be of a material capable of affording a liquid-tight barrier, as well as supporting the liquid load.

Thus as shown in FIG. 5, the structural panel in accordance with the invention, is provided with a composite balsa-foam plastic core 27, or any other composite core as described hereinabove, having good structural and thermal characteristics, the core being covered with an inner facing sheet 28 and an outer facing sheet 29.

The inner facing sheet must be impermeable to liquid and to this end may be fabricated of metals, high-pressure phenolics or impregnated wood. The junctions of adjoining panels whose edges dove tail or are mitered, are filled with a suitable flexible insulation 30 and 31, to produce an expansion joint, the expansion joint at the inner facing being sealed by a suitable strip 32 of flexible material. Thus the structural panels define the liquid container as well as providing thermal insulation therefor.

Figure 7:
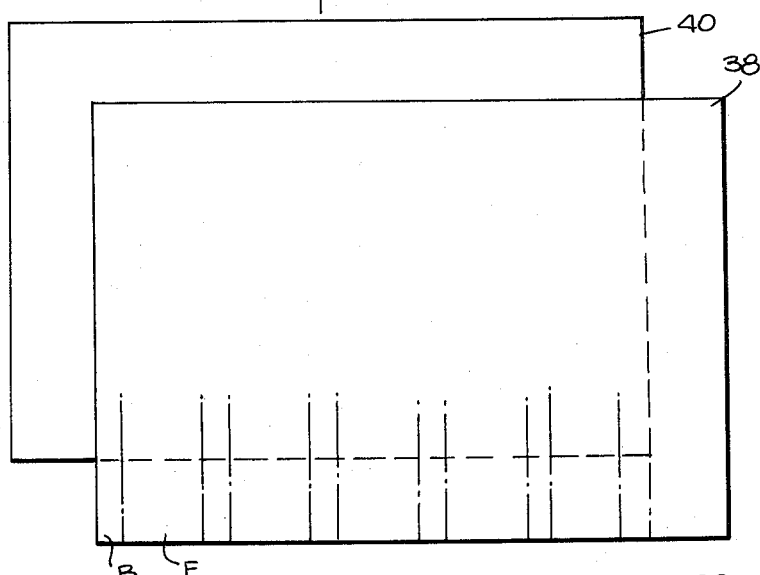
FIG. 7 is a section taken through the wall of the enclosure.

Referring now to FIGS. 6 and 7, there is shown a preferred form of an enclosure in accordance with the invention, making use of composite core panels for thermal insulation and structural support. The enclosure is adapted to store fluids at cryogenic to high temperatures. Thus the inner face of the enclosure is subjected to extremely low or high temperatures, while the outer face is exposed to ambient temperature.

The insulated enclosure must meet two basic requirements, viz.; the structural and the thermal. The insulated panel must be of sufficient strength to support the load to which it is subjected. It must also provide the necessary insulation to maintain the desired temperature (low or high) within the proper limits despite wide variations in ambient temperature. Moreover, the panel must be capable of withstanding the stresses produced by wide thermal gradient in the panel.

The wall of the enclosure is cylindrical, the roof is conical and the flat floor is circular. The enclosure is constituted by an outer shell 33, an array of insulated structural panels 34 which are supported on the shell by a support system 35 formed of suitable brackets or other means, a liquid impervious membrane or skin 36 and/or an inner lining 37 of plywood or other suitable material.

The structural panels which preferably include a composite core of balsa wood and a non-structural insulating material such as polyurethane foam, styrofoam, PVC foam or any other combination of material disclosed hereinabove bonded to a carrying member such as a flexible non-stretchable, open-mesh scrim or a material that can be used as a secondary barrier, such as a plastic sheet, paper or a polyurethane skin. The panel not only maintains the fluid inside the enclosure at the desired low or high temperature, but also withstands the fluid pressure.

An enclosure of this type can be readily built at relatively low cost, and despite its light weight, is of high structural strength. The enclosure arrangement is such as to eliminate continuous air pockets and heat loss due to convection. The enclosure not only has superior insulation characteristics, but is capable of withstanding impact and vibration loads. Moreover, the panels, because of their composite core structure, are easily contourable and can be made to assume the curvature of the enclosure.

Figure 8:
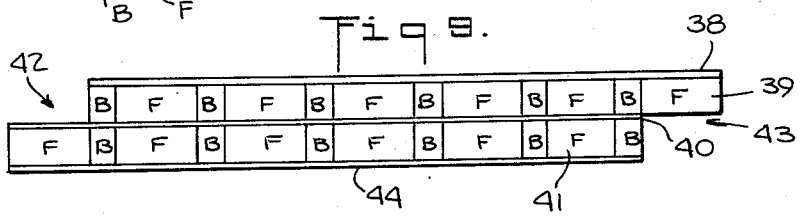
FIG. 8 is a plan view of another preferred embodiment of a two-layer structural panel in accordance with the invention.

Referring now to FIGS. 7 and 8, there is shown another preferred form of structural panel in accordance with the invention. The panel is constituted by offset top and botton layers which define ledges and overhangs making it possible to interfit or dovetail adjoining panels to produce large walls.

The top lay is formed by a facing ply 38, formed of a suitable fire-retardant material, which may be a plywood or other sheet material processed to render it fire-retardant or fire-resistant. Ply 38 is bonded to a layer 39 of beams of balsa B in spaced, parallel relation which alternate with parallel slabs of rigid foam plastic material F having a $k$-factor suitable for cryogenic or thermal insulation.

The bottom layer which is laminated to the top layer, is formed by a plywood sheet 40 bonded to a layer of alternate balsa and rigid foam beams B and F, identical to those in the upper layer but in reverse order, so that whereas the first beam in the upper layer is balsa and the last is foam, in the lower layer the first is foam and the last is balsa.

The upper layer is so displaced from the lower layer as to bring about registration of superposed balsa and foam beams, whereby the ledge 42 formed by the lower layer is foam and the overhang 43 formed by the upper layer is also foam. This registration of like materials is important, for otherwise a balsa beam would overlie a foam beam incapable of supporting the load imposed on the balsa beam. Under the bottom layer and bonded thereto is another fire-retardant ply 44.

While there have been shown and described preferred embodiments of structural panel with composite core and enclosures formed thereby, in accordance with the invention, it will be appreciated that many changes and modifications may be made therein without, however, departing from the essential spirit of the invention.

We claim:

1. A light-weight, high strength structural panel suitable for cryogenic applications, said panel comprising a core having an upper and a lower face and at least one layer formed by a series of balsa beams having a $k$-factor which affords thermal insulation suitable for cryogenic applications in spaced relation and a series of slabs of synthetic thermal insulating material disposed in the spacings between the beam, the $k$-factor of said slabs being similar to that of said beams, and at least one facing sheet bonded to one of said faces.

2. A panel as set forth in claim 1, further including a facing sheet bonded to the other face of the core.

3. A panel as set forth in claim 1, wherein said synthetic thermal insulating material is a rigid foam plastic material.

4. A panel as set forth in claim 3, wherein said foam material is selected from the class consisting of polyurethane, polystyrene, polyvinyl chloride and foamed glass.

5. A panel as set forth in claim 1, wherein said facing sheet is formed by an open-mesh scrim fabricated of a flexible, non-stretchable material.

6. A panel as set forth in claim 1, wherein said slabs are pre-compressed to an extent avoiding gapping as a result of thermal contraction.

7. A panel as set forth in claim 2, wherein said facing sheets are formed of metallic sheeting.

8. A panel as set forth in claim 1, wherein said core is composed of a plurality of supporting layers, the beams and slabs of each layer being displaced relative to those of the other layers.

9. A panel as set forth in claim 8, wherein three layers are provided, the layers being mutually displaced by 60°.

10. A container for a cryogenic liquid, including a tank for storing said liquid, said tank being mounted on a panel as set forth in claim 1.

11. A container as set forth in claim 10, further including an insulating jacket surrounding the tank and formed of the same core material.

12. A panel as set forth in claim 1, said panel having a top layer formed by a series of balsa beams in spaced relation to a series of slabs of synthetic thermal insulating material disposed in the spacing between the beams, and a bottom layer displaced from the top layer to define a ledge and an overhang to facilitate connection to adjoining panels, the beams and slabs in the top layer which overlie the bottom layer being in registration with identical beams and slabs in the bottom layer.

* * * * *

UNITED STATES PATENT OFFICE
CERTIFICATE OF CORRECTION

Patent No. 3,773,604                Dated November 20, 1973

Inventor(s)    Ramesh R. Desai and George D. Dohn

It is certified that error appears in the above-identified patent and that said Letters Patent are hereby corrected as shown below:

IN THE TITLE, line 2 "THERAL" should have read -- THERMAL --

Col. 1, line 52 "realized" should have read -- of --
        line 56 "In" should have read -- in --

Col. 2, line 13 "high" should have read -- higher --

Col. 4, line 49 "ik-factor" should have read -- k-factor --

Col. 6, line 32 "insulation, material" should have read
           -- insulation material, --

Col. 7, line 61 "botton" should have read -- bottom --

Col. 8, line 35 "beam" should have read -- beams --

Signed and sealed this 6th day of August 1974.

(SEAL)
Attest:

McCOY M. GIBSON, JR.           C. MARSHALL DANN
Attesting Officer               Commissioner of Patents